United States Patent
Kimura et al.

(10) Patent No.: US 8,815,336 B2
(45) Date of Patent: Aug. 26, 2014

(54) MAGNETIC RECORDING MEDIUM MANUFACTURING METHOD

(71) Applicant: Kabushiki Kaisha Toshiba, Tokyo (JP)

(72) Inventors: Kaori Kimura, Yokohama (JP); Masatoshi Sakurai, Tokyo (JP); Kazuto Kashiwagi, Yokohama (JP); Akihiko Takeo, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/658,658

(22) Filed: Oct. 23, 2012

(65) Prior Publication Data

US 2014/0004272 A1 Jan. 2, 2014

(30) Foreign Application Priority Data

Jun. 28, 2012 (JP) ................ 2012-145757

(51) Int. Cl.
*B05D 5/12* (2006.01)
*G11B 5/84* (2006.01)
*G11B 5/74* (2006.01)

(52) U.S. Cl.
CPC .. *G11B 5/84* (2013.01); *G11B 5/746* (2013.01)
USPC .......... 427/127; 428/836; 428/836.1

(58) Field of Classification Search
CPC .................. G11B 5/84; G11B 5/746
USPC ................ 427/127; 428/836, 836.1
See application file for complete search history.

(56) References Cited

U.S. PATENT DOCUMENTS

| | | | |
|---|---|---|---|
| 6,602,620 B1 | 8/2003 | Kikitsu et al. | |
| 7,923,136 B2 | 4/2011 | Kimura et al. | |
| 2002/0168548 A1* | 11/2002 | Sakurai et al. | 428/694 BR |
| 2009/0166321 A1* | 7/2009 | Albrecht et al. | 216/22 |
| 2009/0305082 A1* | 12/2009 | Takeshita | 428/848.1 |
| 2010/0128583 A1 | 5/2010 | Albrecht et al. | |
| 2012/0196094 A1* | 8/2012 | Xu et al. | 428/195.1 |

FOREIGN PATENT DOCUMENTS

| | | |
|---|---|---|
| JP | 10-255407 | 9/1998 |
| JP | 2000-251236 | 9/2000 |
| JP | 2008-084535 | 4/2008 |
| JP | 4110204 | 4/2008 |
| JP | 2009-087454 | 4/2009 |
| JP | 2009-230809 | 10/2009 |

* cited by examiner

*Primary Examiner* — Michael Wieczorek
*Assistant Examiner* — Sarah R Anderson
(74) *Attorney, Agent, or Firm* — Knobbe, Martens, Olson & Bear LLP

(57) ABSTRACT

According to one embodiment, there is provided a magnetic recording medium manufacturing method including forming a resist layer on a magnetic recording layer, patterning the resist layer, forming a magnetic pattern by performing ion implantation through the resist layer, partially modifying the surface of the magnetic recording layer, removing the resist, applying a self-organization material to the surface of the magnetic recording layer and forming a dotted mask pattern, and patterning the magnetic recording layer.

14 Claims, 7 Drawing Sheets

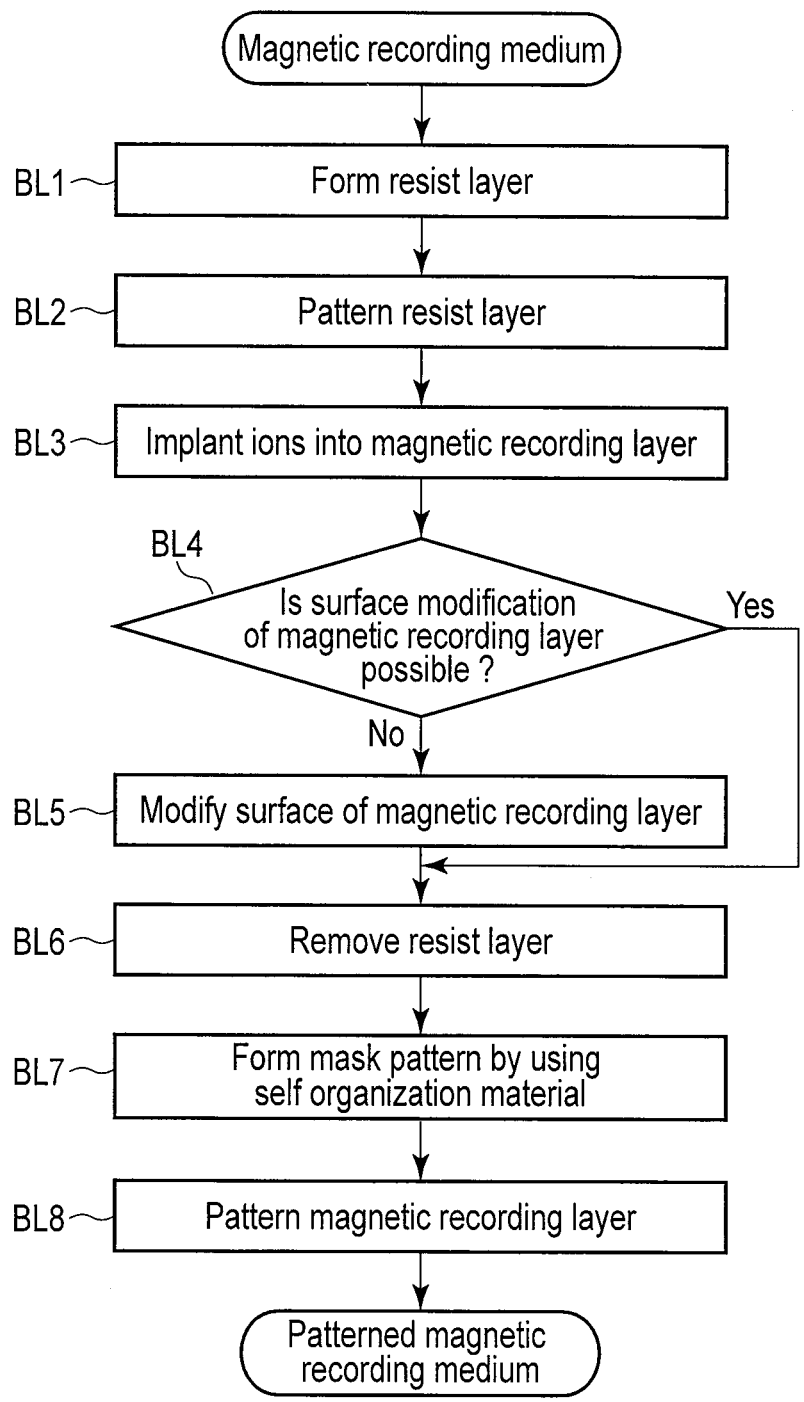
F I G. 1

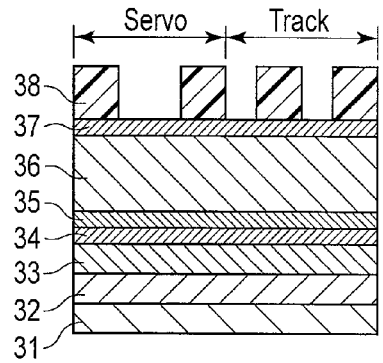
F I G. 7A
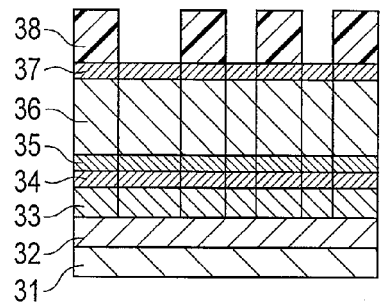
F I G. 7B
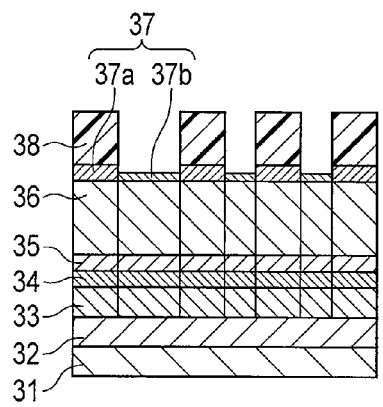
F I G. 7C
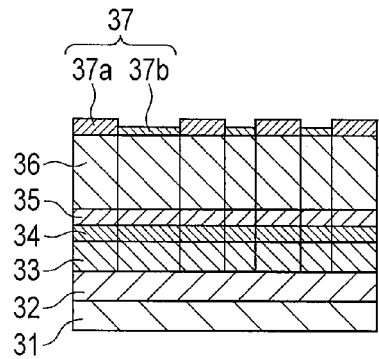
F I G. 7D
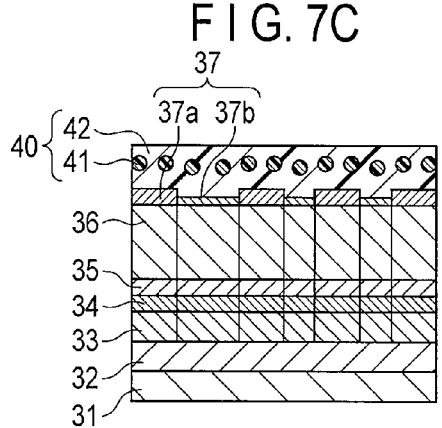
F I G. 7E
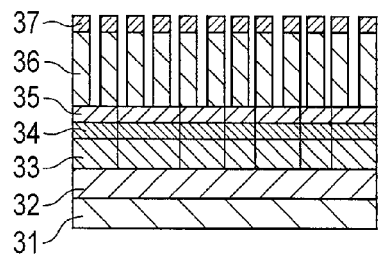
F I G. 7F
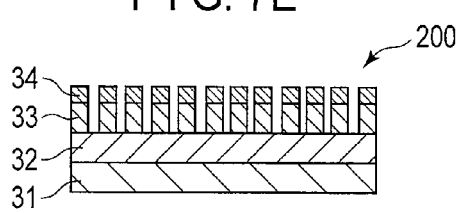
F I G. 7G

MAGNETIC RECORDING MEDIUM MANUFACTURING METHOD

CROSS-REFERENCE TO RELATED APPLICATIONS

This application is based upon and claims the benefit of priority from Japanese Patent Application No. 2012-145757, filed Jun. 28, 2012; the entire contents of which are incorporated herein by reference.

FIELD

Embodiments described herein relate generally to a magnetic recording medium manufacturing method.

BACKGROUND

In a conventional bit patterned medium (BPM), self-organization is combined with imprinting or an imprint pattern of a master template obtained by a method such as an electron beam lithography, and a desired magnetic pattern is obtained by the presence/absence (three-dimensional structure) of a magnetic recording layer. In a medium like this, a pattern density difference is produced between a servo area and data area. Since the pattern density difference directly affects the floatability of a recording head, it is necessary to reduce the density difference as much as possible in the BPM. However, the density difference is difficult to reduce because the pattern densities in the servo area and data area are predetermined. Although a method of filling up the three-dimensional structure of the medium is available as a measure, the filling performance changes in accordance with the pattern density or pattern size even when performing filling. This makes it difficult to planarize the medium surface by a practical process.

BRIEF DESCRIPTION OF THE DRAWINGS

FIG. 1 is a flowchart for explaining a magnetic recording medium manufacturing method according to an embodiment;

FIGS. 7A, 7B, 7C, 7D, 7E, 7F, and 7G are views showing another example of the magnetic recording medium manufacturing method according to the first embodiment;

DETAILED DESCRIPTION

Figure 2:
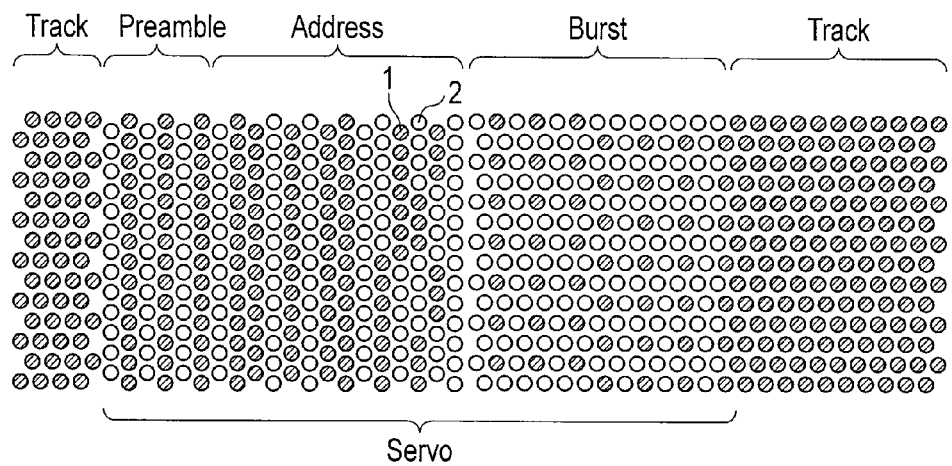
FIG. 2 is a plan view showing a servo area of a magnetic recording medium manufactured by the method according to the embodiment.

In general, according to one embodiment, there is provided a magnetic recording medium manufacturing method including the steps of preparing a magnetic recording medium including a substrate and a magnetic recording layer formed on the substrate, and forming a resist layer on the magnetic recording layer, patterning the resist layer, performing ion implantation through the resist layer, thereby partially inactivating the magnetism of the magnetic recording layer to form a magnetic pattern, partially modifying the surface of the magnetic recording layer through the resist layer, removing the resist, applying a self-organization material to the partially modified surface of the magnetic recording layer, thereby forming a mask pattern, and patterning the magnetic recording layer in accordance with the mask pattern.

The embodiment will be explained below with reference to the accompanying drawings.

FIG. 1 is a flowchart for explaining the magnetic recording medium manufacturing method according to the embodiment.

As shown in FIG. 1, in the magnetic recording medium manufacturing method according to the embodiment, a magnetic recording medium including a substrate and a magnetic recording layer formed on the substrate is prepared, and a resist layer is formed on the magnetic recording layer (BL1).

Then, the resist layer is patterned (BL2).

Subsequently, ion implantation is performed through the resist layer, thereby partially inactivating the magnetism of the magnetic recording layer and forming a magnetic pattern (BL3).

After that, whether surface modification of the magnetic recording layer is made possible in step BL3 is checked (BL4).

If surface modification of the magnetic recording layer is not possible, a step (BL5) of partially modifying the surface of the magnetic recording layer through the resist layer is performed, and then a step (BL6) of removing the resist is performed.

On the other hand, if surface modification of the magnetic recording layer is made possible in step BL3, the step (BL6) of removing the resist layer is performed by omitting the step (BL5) of partially modifying the surface of the magnetic recording layer through the resist layer.

Furthermore, a self-organization material is applied to the partially modified surface of the magnetic recording layer to cause phase separation, thereby forming a dotted mask pattern (BL7).

After that, the magnetic recording layer is patterned in accordance with the mask pattern (BL8).

The magnetic recording medium manufacturing method according to the embodiment is classified into the first and second embodiments.

A magnetic recording medium manufacturing method according to the first embodiment includes the steps of preparing a magnetic recording medium including a substrate and a magnetic recording layer formed on the substrate, and forming a resist layer on the magnetic recording layer, patterning the resist layer, performing ion implantation through the resist layer, thereby partially inactivating the magnetism of the magnetic recording layer to form a magnetic pattern, partially modifying the surface of the magnetic recording layer through the resist layer, removing the resist, applying a self-organization material to the partially modified surface of the magnetic recording layer, thereby causing phase separation and forming a dotted mask pattern, and patterning the magnetic recording layer in accordance with the mask pattern.

In this embodiment, the magnetic recording layer is formed by a uniform dotted pattern, and the dotted pattern has a magnetic pattern region and magnetism-inactivated region. Therefore, the dotted pattern forming the magnetic recording layer apparently has no density difference, so the floating of a magnetic head can stabilize. Also, the recesses between the dots can easily be filled because the dot pitch is uniform.

Before the step of forming the resist layer, at least one mask layer can further be formed on the magnetic recording layer.

Forming the mask layer facilitates processing the tapered magnetic recording layer.

The step of partially modifying the surface of the magnetic recording layer includes, e.g., forming, on the surface of the magnetic recording layer through the resist layer, a chemical modification layer for promoting the arrangement of the dotted mask pattern of the self-organization material, or forming steps on the mask layer by partially etching the surface of the mask layer through the resist layer.

In this embodiment as described above, the three-dimensional structures of the chemical modification layer and mask layer obtained by partially modifying the surface of the magnetic recording layer can be used as guides for promoting the arrangement of the dotted mask pattern of the self-organization material.

A magnetic recording medium manufacturing method according to the second embodiment includes the steps of preparing a magnetic recording medium including a substrate and a magnetic recording layer formed on the substrate, and forming a resist layer on the magnetic recording layer, patterning the resist layer, performing ion implantation through the resist layer, thereby partially inactivating the magnetism of the magnetic recording layer to form a magnetic pattern, and partially modifying the surface of the magnetic recording layer, removing the resist, applying a self-organization material to the partially modified surface of the magnetic recording layer, thereby causing phase separation and forming a dotted mask pattern, and patterning the magnetic recording layer in accordance with the mask pattern.

In the second embodiment, the magnetic recording layer is formed by a uniform dotted pattern, and the dotted pattern has a magnetic pattern region and magnetism-inactivated region, as in the first embodiment. Therefore, the dotted pattern forming the magnetic recording layer apparently has no density difference, so the floating of a magnetic head can stabilize. Also, the recesses between the dots can easily be filled because the dot pitch is uniform.

In the second embodiment, steps can be formed by partially expanding the magnetic recording layer by ion implantation.

Since a three-dimensional structure can be formed on the magnetic recording layer by ion implantation and used as a guide, no substrate brushing process is necessary.

Also, in the method according to the second embodiment, at least one mask layer can be formed on the magnetic recording layer having the partially modified surface, before the step of forming the dotted mask pattern.

Forming the mask layer facilitates processing the tapered magnetic recording layer.

In the first and second embodiments, the step of patterning the resist layer can be performed by, e.g., an imprinting method.

In addition, the resist layer can be used in at least patterning of a servo area.

Patterning of the magnetic recording layer can be performed by, e.g., ion milling.

Furthermore, after the step of patterning the magnetic recording layer, the patterned magnetic recording layer can be planarized by filling. In the embodiment, it is readily possible to reduce the unevenness of filling because the three-dimensional pattern density is uniform.

When using the magnetic recording medium manufacturing method according to the embodiment, a bit patterned medium in which the three-dimensional pattern density is uniform on the entire surface of a magnetic recording medium is obtained. Also, the embodiment can manufacture a magnetic recording medium by using a simple method, because no orientation is necessary during imprinting.

FIG. 2 is a plan view of a magnetic recording medium manufactured by the method according to the embodiment.

Dots 1 and 2 are portions physically projecting from the medium surface.

The dots 1 have magnetism and form a magnetic pattern. The magnetism of the dots 2 is inactivated.

A recording dot (track) area, preamble area, address area, burst area, and recording dot area are arranged in order from the left to the right. This magnetic pattern is so designed as to obtain a magnetic signal equal to that of a non-bit patterned medium when the signal is read by a head.

Figure 3:
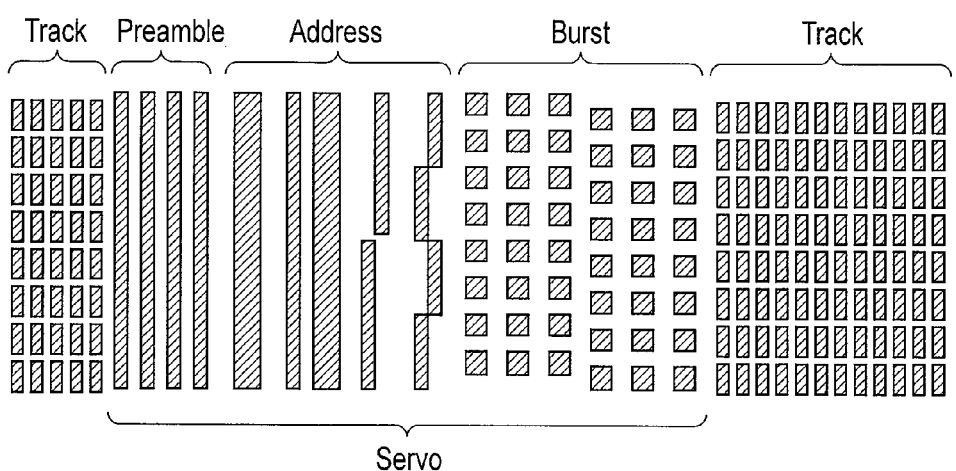
FIG. 3 is a plan view showing a servo area of a magnetic recording medium for comparison.

For comparison, FIG. 3 shows a servo pattern example of a magnetic recording medium that is not a bit patterned medium and includes a continuous magnetic recording layer.

Figure 4:
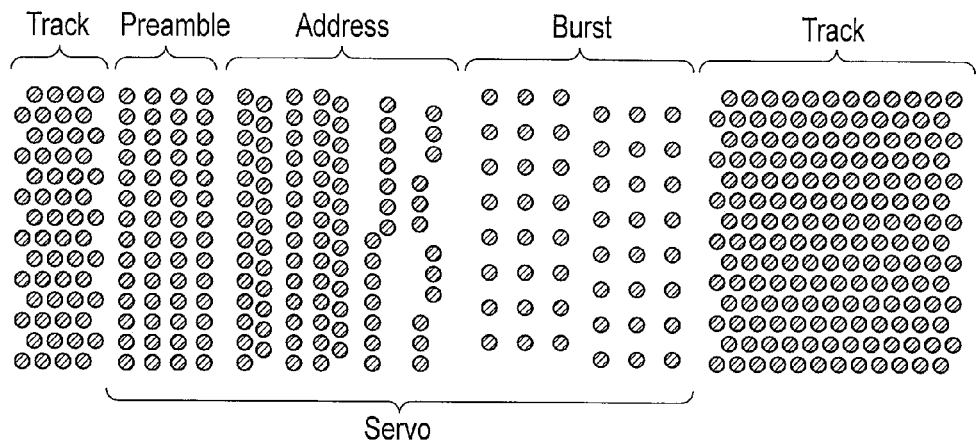
FIG. 4 is a plan view showing a servo area of a magnetic recording medium for comparison.

For more comparison, FIG. 4 shows a servo pattern example of a patterned medium including a magnetic recording layer having a three-dimensional pattern formed by only magnetized dots.

In this patterned medium, the pattern densities of the burst area and dot area are largely different, so a head fall readily occurs in the burst area.

In the servo pattern shown in FIG. 4, dots can be arranged such that a signal equal to that obtained by the pattern shown in FIG. 3 is obtained when the signal is read by a head. The dot size in the servo area need not always be the same as that of recording dots. However, when one unit of the servo recording area has a large size over a few µm, magnetic domains are generated in the area, so the servo can be partitioned at a predetermined interval. As will be described in later examples, when writing a pattern by a method such as self-organization, the recording dots and servo dots have almost the same size.

In the servo area shown in FIG. 2, the pattern density (e.g., the recording layer projection area per 100-µm square) is held almost constant, except in a very narrow region for pattern switching. In this servo area, a ferromagnetic material is formed along a pattern necessary for a servo signal, and the rest of the pattern (the dots 2 in FIG. 2; these dots will be called nonmagnetic dots for convenience, although the Ms may remain) has no magnetism, even on projections, on a level having influence on a signal. When only the magnetic dot portion shown in FIG. 2 is extracted, the shape is almost the same as that of the layout of the bit patterned medium shown in FIG. 4.

The shape and size of the nonmagnetic dots are not limited, as long as the pattern density is constant. However, if the pattern area is large compared to the slider of a head, the influence of floating increases, so the maximum size can be set to 1/10 or less the slider. Especially when filling is performed, the pattern area can be increased to about five times as large as the minimum dot size. Also, when filling and the adhesion of a medium protective film are taken into consideration, the taper of the magnetic dots and that of the nonmagnetic dots viewed in the cross-sectional direction can be uniform.

The composition of the nonmagnetic dots can be close to that of the magnetic dots, in order to uniformize the adhesion and shock resistance of the protective film on the medium surface. For example, dots can be demagnetized by adding a given material to the magnetic dots. If the same performance can be maintained, however, it is also possible to use materials having entirely different compositions and the same characteristics.

The embodiments will be explained in more detail below by way of its examples.

Example 1

An example of the magnetic recording medium manufacturing method according to the first embodiment will be explained with reference to FIGS. 5A, 5B, 5C, 5D, 5E, 5F, and 5G.

Figure 5A:
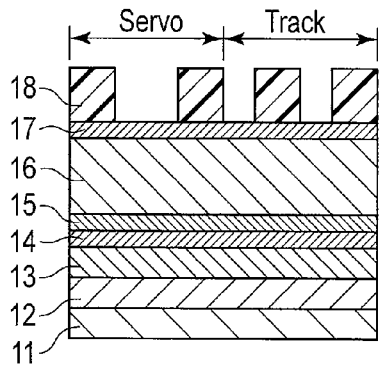
FIGS. 5A, 5B, 5C, 5D, 5E, 5F, and 5G are views showing an example of a magnetic recording medium manufacturing method according to the first embodiment.

As shown in FIG. 5A, a 40-nm thick soft magnetic layer (CoZrNb) (not shown), a 20-nm thick orientation control interlayer 12 (Ru), 10-nm thick $Co_{80}Pt_{20}$ as a magnetic recording layer 13, a 2-nm thick protective film 14 (Pd), a 5-nm thick liftoff layer 15 (Mo), a 20-nm thick first hard mask 16 (C), and a 3-nm thick second hard mask 17 (Si) were deposited on a glass substrate 11.

Figure 6:
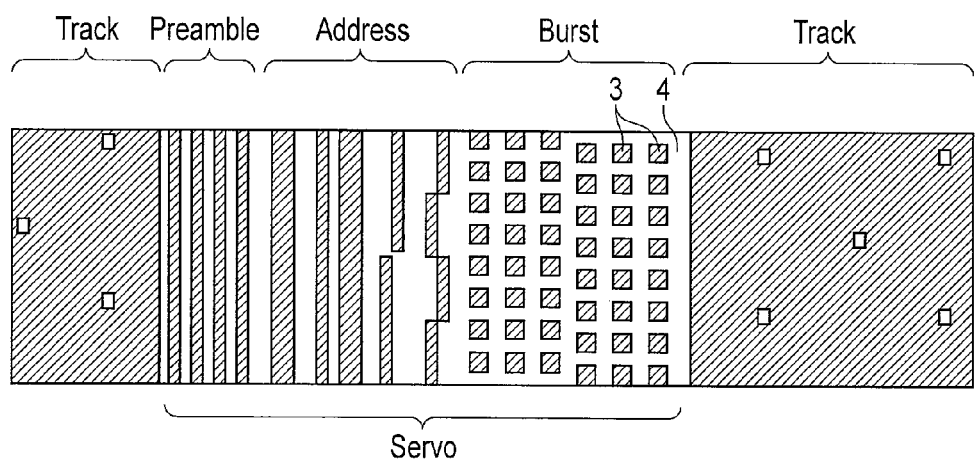
FIG. 6 is a view showing an example of a three-dimensional pattern of an imprinting resin stamper to be used in the embodiment.

FIG. 6 is a view showing an example of a three-dimensional pattern of an imprinting resin stamper.

In FIG. 6, a region denoted by reference numeral 4 indicates a projection, and a region denoted by reference numeral 3 indicates a recess.

Then, a resist layer 18 was formed on the substrate 11 by coating it with, e.g., a 40-nm thick UV resist. A PC (polycarbonate) resin stamper on which the pattern as shown in FIG. 6 was written was opposed to the resist layer 18, and pressed against the resist layer 18 in a vacuum. After that, UV light was radiated, and the resin stamper was released from the resist layer, thereby transferring the imprint pattern of the resist layer 18 onto the second hard mask 17.

Figure 5B:
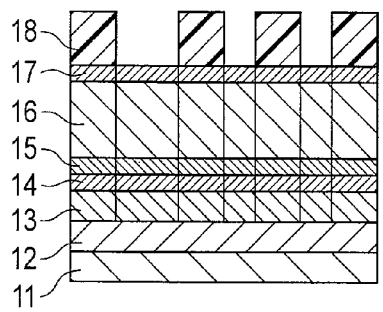

As shown in FIG. 5B, the imprint pattern was used as a mask to partially inactivate the magnetism of the recording layer by ion implantation. For example, P ions were implanted into the magnetic recording layer 13 at an energy of 20 keV and a density of $5\times10^{16}$ ions/cm$^2$.

Figure 5C:
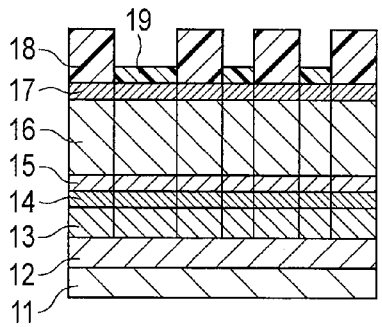

As shown in FIG. 5C, the medium surface was coated with a PS (polystyrene) layer 19 as a chemical modification layer, thereby chemically modifying the surface of the second hard mask 17. The PS layer 19 had a function of improving the arrangement of a self-organization material.

Figure 5D:
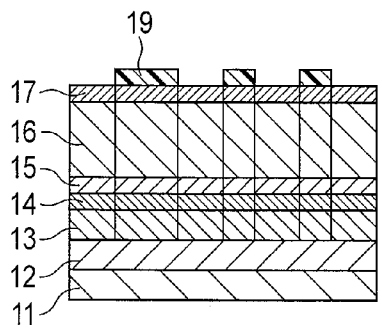

As shown in FIG. 5D, a monomolecular film was formed by rinsing the surface with a propylene glycol monomethyl-ether acetate (PGMEA) solvent. The resist layer 18 was removed simultaneously with rinsing.

Figure 5E:
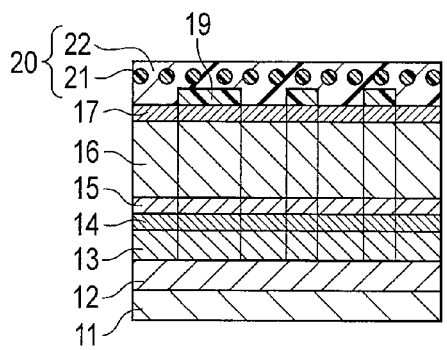

As shown in FIG. 5E, the surface-modified second hard mask 17 was spin-coated with a self-organization material PS-PDMS (polystyrene-polydimethylsiloxane), thereby forming a self-organization material layer 20. When annealing was performed at 150° C. for 10 hrs to cause phase separation in the self-organization material layer 20, PDMS spheres 21 floated in a PS sea 22. When this medium was observed with a planar SEM, dots were arranged to form a hexagonal close-packed structure along the PS pattern.

Figure 5F:
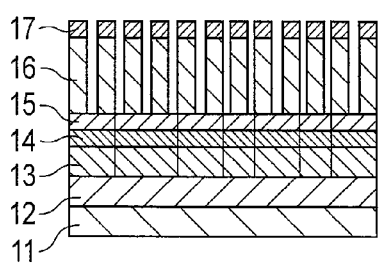

As shown in FIG. 5F, the mask pattern of the PDMS spheres 21 was transferred to the Si mask 17 by dry etching. For example, this step was performed by sequentially using $O_2$ gas and $CF_4$ gas as process gases in an inductively coupled plasma (ICP) RIE apparatus for etching times of 60 sec and 60 sec, respectively, at a chamber pressure of 0.1 Pa, a coil RF power of 100 W, and a platen RF power of 10 W. Subsequently, the pattern of the Si mask 17 was transferred to the C mask 16. Similarly, this process was performed by using $O_2$ gas as a process gas in the ICP-RIE apparatus for an etching time of 100 sec at a chamber pressure of 0.1 Pa, a coil RF power of 100 W, and a platen RF power of 10 W.

Figure 5G:
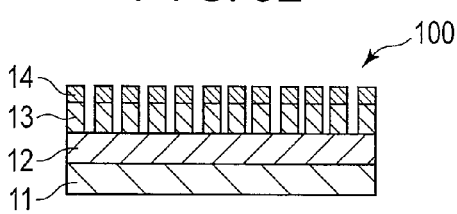

As shown in FIG. 5G, the shape of the C mask 16 was transferred to the protective layer 14 and magnetic recording layer 13 in order by ion milling. For example, this process was performed by using Ar as a process gas in an Ar ion milling apparatus for an etching time of 10 sec at a chamber pressure of 0.04 Pa, a plasma power of 400 W, and an acceleration voltage of 400 V. Subsequently, the C mask 16 and Si mask 17 were removed together with the Mo liftoff layer 15. For example, this step was performed by dipping the medium in a 0.1% hydrogen peroxide solution, and holding the medium in it for 10 min.

Finally, a second protective film (not shown) was formed by CVD (Chemical Vapor Deposition) and coated with a lubricant (not shown), thereby obtaining a patterned medium 100 according to the embodiment.

When the floatability of the bit patterned medium manufactured by the method as described above was evaluated by using a glide head having a designed floating amount of 10 nm, the head stably floated with a head floating amount of 15 to 7 nm. No floating amount decrease was found in the servo area. This result shows that the medium having the arrangement of this patent could secure a stable floating amount as a bit patterned medium.

Example 2

Another example of the magnetic recording medium manufacturing method according to the first embodiment will be explained with reference to FIGS. 7A, 7B, 7C, 7D, 7E, 7F, and 7G.

As shown in FIG. 7A, a 40-nm thick soft magnetic layer (CoZrNb) (not shown), a 50-nm thick orientation control interlayer 32 (MgO), 5-nm thick $L1_0$-oriented $Fe_{50}Pt_{50}$ as a magnetic recording layer 33, a 3-nm thick protective film 34 (Pt), a 5-nm thick liftoff layer 35 (W), a 20-nm thick first hard mask 36 (C), and a 3-nm thick second hard mask 37 (Si) were deposited on a glass substrate 31.

Then, a resist layer 38 was formed on the second hard mask 37 by coating it with, e.g., a 40-nm thick UV resist. A PC (polycarbonate) resin stamper on which the pattern as shown in FIG. 6 was written was opposed to the resist layer 38, and pressed against the resist layer 38 in a vacuum. After that, UV light was radiated, and the resin stamper was released from the resist layer, thereby transferring an imprint pattern of the resist layer 38 onto the substrate 31.

The imprint residue on the bottom of the imprinted pattern can be removed by $O_2$ plasma irradiation as needed.

As shown in FIG. 7B, the imprinted pattern was used as a mask to inactivate the magnetism of the recording layer by ion implantation. For example, C ions were implanted into the magnetic recording layer 33 at an energy of 5 keV and a density of $5\times10^{16}$ ions/cm$^2$.

As shown in FIG. 7C, the shape of the imprint resist was transferred to the hard mask by dry etching. For example, this process was performed by using $CF_4$ gas as a process gas in an ICP-RIE apparatus for an etching time of 10 sec at a chamber pressure of 0.1 Pa, a coil RF power of 100 W, and a platen RF power of 10 W. In this step, shallow etching was performed on portions of the Si hard mask to form a second hard mask 37 having a three-dimensional structure of 2 nm or less including unetched projections 37a and etched recesses 37b.

As shown in FIG. 7D, the imprint resist was removed by dry etching. This process was performed by using $O_2$ gas as a process gas in the ICP-RIE apparatus for an etching time of 20 sec at a chamber pressure of 1 PA, a coil RF power of 100 W, and a platen RF power of 50 W.

As shown in FIG. 7E, the second hard mask 37 was spin-coated with a self-organization material PS-PDMS (polystyrene-polydimethylsiloxane), thereby forming a self-organization material layer 40. When annealing was performed at 150° C. for 10 hrs to cause phase separation in the self-organization material layer 40, PDMS spheres 41 floated in a PS sea 42. When this medium was observed with a planar SEM, the PDMS dots were arranged along the three-dimensional pattern formed on the medium surface.

As shown in FIG. 7F, the mask pattern of the PDMS spheres 41 was transferred to the Si mask 37 by dry etching. For example, this step was performed by sequentially using $O_2$ gas and $CF_4$ gas as process gases in an inductively coupled plasma (ICP) RIE apparatus for etching times of 60 sec and 60 sec, respectively, at a chamber pressure of 0.1 Pa, a coil RF power of 100 W, and a platen RF power of 10 W. Subsequently, the pattern of the Si mask 37 was transferred to the C mask 36. Similarly, this process was performed by using $O_2$ gas as a process gas in the ICP-RIE apparatus for an etching time of 100 sec at a chamber pressure of 0.1 Pa, a coil RF power of 100 W, and a platen RF power of 10 W.

As shown in FIG. 7G, the shape of the C mask 36 was transferred to the protective layer 34 and magnetic recording layer 33 in order by ion milling. For example, this process was performed by using Ar as a process gas in an Ar ion milling apparatus for an etching time of 8 sec at a chamber pressure of 0.04 Pa, a plasma power of 400 W, and an acceleration voltage of 400V. Subsequently, the C mask 36 and Si mask 37 were removed together with the W liftoff layer 35. For example, this step was performed by dipping the medium in a 0.1% hydrogen peroxide solution, and holding the medium in it for 5 min.

Finally, a second protective film (not shown) was formed by CVD (Chemical Vapor Deposition) and coated with a lubricant (not shown), thereby obtaining a patterned medium 200 according to the present invention.

When the floatability of the bit patterned medium manufactured by the method as described above was evaluated by using a glide head having a designed floating amount of 10 nm, the head stably floated with a head floating amount of 15 to 7 nm. No floating amount decrease was found in the servo area. This result demonstrates that the medium having the arrangement of this patent could secure a stable floating amount as a bit patterned medium.

Example 3

The magnetic recording medium manufacturing method according to the second embodiment will be explained with reference to FIGS. 8A, 8B, 8C, 8D, 8E, 8F, and 8G.

Figure 8A:
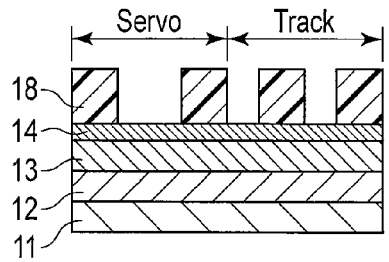
FIGS. 8A, 8B, 8C, 8D, 8E, 8F, and 8G are views showing an example of a magnetic recording medium manufacturing method according to the second embodiment.

As shown in FIG. 8A, a 40-nm thick soft magnetic layer (CoZrNb) (not shown), a 20-nm thick orientation control interlayer (Ru) 12, 10-nm thick $Co_{80}Pt_{20}$ as a magnetic recording layer 13, and a 3-nm thick protective film (Pd) were deposited on a glass substrate 11.

Then, a resist layer 18 was formed on the substrate 11 by coating it with, e.g., a 40-nm thick UV resist. A PC (polycarbonate) resin stamper on which the pattern as shown in FIG. 6 was written was opposed to the resist layer 18, and pressed against the resist layer 18 in a vacuum. After that, UV light was radiated, and the resin stamper was released from the resist layer, thereby transferring an imprint pattern of the resist layer 18 onto the substrate 11. The imprint residue on the bottom of the imprinted pattern may be removed by $O_2$ plasma irradiation.

Figure 8B:
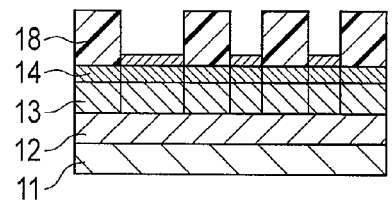

As shown in FIG. 8B, the imprinted pattern was used as a mask to partially inactivate the magnetism of the recording layer 13 by ion implantation. For example, P ions were implanted at an energy of 10 keV and a density of $3\times10^{16}$ ions/cm$^2$. By this ion implantation, the recording layer 13 slightly expanded and increased the volume. As shown in FIG. 8B, the recording layer 13 formed a three-dimensional structure about 2 nm thick including regions 23 where ions were implanted and the magnetic layer 13 expanded and regions 24 where no ions were implanted and the magnetic layer 13 did not expand. The region 23 where ions were implanted and the magnetic layer 13 expanded can be regarded as a region where the surface of the magnetic layer 13 was partially modified. This three-dimensional structure can be confirmed by observation using, e.g., an AFM (Atomic Force Microscope).

Figure 8C:
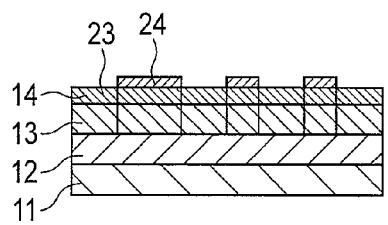

As shown in FIG. 8C, the UV resist after ion implantation was removed by $O_2$ ashing. For example, it is possible to selectively remove only the UV resist layer 18 by radiating a plasma for 1 min at an $O_2$ gas pressure of 1 Pa and an ashing plasma power of 400 W by using an $O_2$ asher.

Figure 8D:
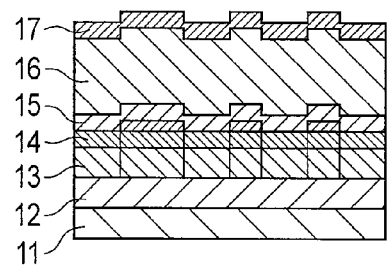

Subsequently, as shown in FIG. 8D, a 5-nm thick liftoff layer 15 (W), 30-nm thick first hard mask 16 (C), and 5-nm thick second hard mask 17 (Si) were sequentially deposited on the magnetic recording layer 13 having the partially modified surface. The surface shape of the hard masks 16 and 17 followed the three-dimensional structure on the surface of the recording layer 13, which was partially modified by volume expansion caused by ion implantation.

Figure 8E:
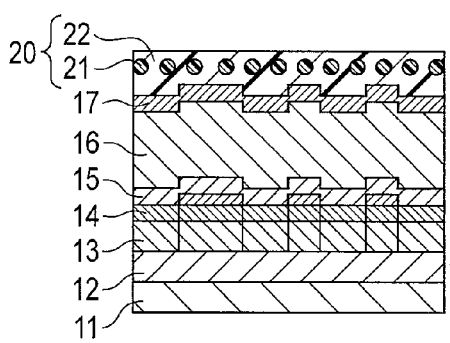

As shown in FIG. 8E, the second hard mask 17 was spin-coated with a self-organization material PS-PDMS (polystyrene-polydimethylsiloxane), thereby forming a self-organization material layer 20. When annealing was performed at 150° C. for 10 hrs to cause phase separation in the self-organization material, PDMS spheres 21 floated in a PS sea 22. Since a three-dimensional structure of a few nm order was formed on the surfaces of the ion-implanted magnetic recording layer 13 and masks 16 and 17, dots were arranged along this three-dimensional structure.

Figure 8F:
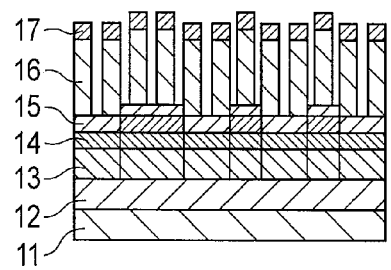

As shown in FIG. 8F, the PDMS spheres 21 were transferred to the Si mask 17 by dry etching. For example, this step was performed by sequentially using $O_2$ gas and $CF_4$ gas as process gases in an inductively coupled plasma (ICP) RIE apparatus for etching times of 60 sec and 60 sec, respectively, at a chamber pressure of 0.1 Pa, a coil RF power of 100 W, and a platen RF power of 10 W. Subsequently, the pattern of the Si mask 17 was transferred to the C mask 16. Similarly, this process was performed by using $O_2$ gas as a process gas in the ICP-RIE apparatus for an etching time of 100 sec at a chamber pressure of 0.1 Pa, a coil RF power of 100 W, and a platen RF power of 10 W.

Figure 8G:
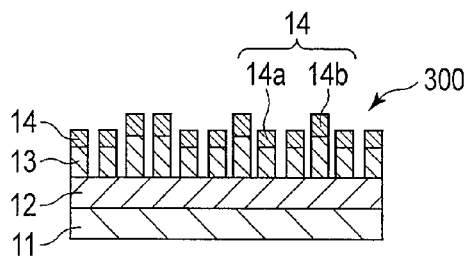

As shown in FIG. 8G, the shape of the C mask 16 was transferred to the protective layer 14 and magnetic recording layer 13 by ion milling. For example, this process was performed by using Ar as a process gas in an Ar ion milling apparatus for an etching time of 10 sec at a chamber pressure of 0.04 Pa, a plasma power of 400 W, and an acceleration voltage of 400 V. Subsequently, the C mask 16 and Si mask 17 were removed together with the W liftoff layer 15. For example, this step was performed by dipping the medium in a 0.1% hydrogen peroxide solution, and holding the medium in it for 5 min.

Finally, a second protective film (not shown) was formed by CVD (Chemical Vapor Deposition) and coated with a lubricant (not shown), thereby obtaining a patterned medium 300 according to the embodiment.

When the floatability of the bit patterned medium manufactured by the method as described above was evaluated by using a glide head having a designed floating amount of 10 nm, the head stably floated with a head floating amount of 15 to 7 nm. No floating amount decrease was found in the servo area. This result reveals that the medium having the arrangement according to this embodiment could secure a stable floating amount as a bit patterned medium.

Comparative Example 1

A method of manufacturing a magnetic recording medium having no dots in a nonmagnetic region will be taken as a comparative example.

Following the same procedures as in Example 1, an imprint pattern of a resist layer was transferred onto a second hard mask.

Neither an ion implantation step nor a chemical modification layer coating step was performed, and the second hard mask on which the resist layer was formed was spin-coated with a self-organization material PS-PDMS, thereby forming a self-organization material layer 20. PS was removed by causing phase separation in the same manner as in Example 1, thereby forming a dotted mask pattern made of PDMS spheres.

The PDMS spheres were transferred to the Si mask by dry etching. For example, this step was performed by sequentially using $O_2$ gas and $CF_4$ gas as process gases in an ICP-RIE apparatus for etching times of 60 sec and 60 sec, respectively, at a chamber pressure of 0.1 Pa, a coil RF power of 100 W, and a platen RF power of 10 W. Since an imprint resist having a low etching resistance was used, the imprint resist disappeared before transfer to the Si mask. Accordingly, projections during imprinting changed into recesses when transferred to the Si mask.

Subsequently, the Si pattern was transferred to the C mask. Similarly, this process was performed by using $O_2$ gas as a process gas in the ICP-RIE apparatus for an etching time of 100 sec at a chamber pressure of 0.1 Pa, a coil RF power of 100 W, and a platen RF power of 10 W.

In addition, the shape of the C mask was transferred to a magnetic recording layer by ion milling. For example, this process was performed by using Ar as a process gas in an Ar ion milling apparatus for an etching time of 10 sec at a chamber pressure of 0.04 Pa, a plasma power of 400 W, and an acceleration voltage of 400 V. Subsequently, the C mask was removed together with a Mo liftoff layer. For example, this step was performed by dipping the medium in a 0.1% hydrogen peroxide solution, and holding the medium in it for 10 min.

Finally, a second protective film was formed by CVD (Chemical Vapor Deposition) and coated with a lubricant (not shown), thereby obtaining a patterned medium. When the medium was observed from the upper surface by using an SEM, the pattern was similar to, e.g., the pattern shown in FIG. 4.

Example 4

A patterned medium was manufactured following the same procedures as in Example 1 except that a three-dimensional structure filling step was added before the formation of a second protective film in FIG. 5G. The filling step was performed by the following process.

A 2-nm thick DLC protective film was deposited on a recording layer given a three-dimensional structure by the formation of a chemical modification layer. In addition, $SiO_2$ was deposited by applying a bias of 50 W to a substrate. $SiO_2$ was filled in grooves having a high aspect ratio without any gaps by bias deposition. $SiO_2$ was deposited to a height of 20 nm from the substrate surface. Furthermore, filled $SiO_2$ was etched back by ion milling using Ar gas, thereby planarizing the surface. This is Example 4-1. This planarization by filling was similarly performed on the media of Examples 2 and 3, thereby obtaining Examples 4-2 and 4-3. The Ra was measured with an AFM as a three-dimensional pattern height in each of the servo area and track area. Consequently, the Ra was 0.7 nm before planarization and 0.2 nm after that. This indicates that planarization improved the medium Ra.

Comparative Example 2

A medium was manufacturing by performing filling on the medium of Comparative Example 1 following the same procedures as in Example 4. After that, the three-dimensional pattern heights in the servo area and track area were respectively 0.5 and 0.2 nm as Ra. A flatness difference was produced after filling because a continuous recess region was wide in the servo area, but projections were densely formed in the track area.

Table 1 below shows the results of the floatability of the above-mentioned examples.

Compared to Examples 1 to 4, Comparative Examples 1 and 2 had many hits. This is presumably because a three-dimensional pattern duty difference was produced between the servo area and track area.

TABLE 1

| Floating amount | 15 nm | 10 nm | 7 nm |
|---|---|---|---|
| Example 1 | ⊚ | ⊚ | ○ |
| Example 2 | ⊚ | ○ | ○ |
| Example 3 | ⊚ | ⊚ | ○ |
| Example 4-1 | ⊚ | ⊚ | ⊚ |
| Example 4-2 | ⊚ | ⊚ | ⊚ |
| Example 4-3 | ⊚ | ⊚ | ⊚ |
| Comparative Example 1 | ○ | Δ | Δ |
| Comparative Example 2 | ○ | ○ | Δ | double circle: no hit,
○: 5 or less hits,
Δ: 20 or less hits

Mask Release Layer and Hard Mask Layer

In the embodiment, a mask release layer and hard mask layer can be formed on the magnetic recording layer as needed. The release layer can be made of a resist or a material such as Mo or W. The release layer can be omitted if mask removal is possible without any release layer e.g., if a mask is made of a resin so that the mask can be removed by an organic solvent, or if a mask can be removed by $O_2$ ashing.

As the hard mask, at least one film is deposited on the recording layer by sputtering or the like. For example, when a self-organization material is PS-PMMA and 10-nm thick C is used as the hard mask layer, only one hard mask is necessary because the selectivity is high. However, if the hard mask is required to have a height to some extent, the hard mask can be given a structure including two or more layers. For example, a mask having a high aspect ratio can be manufactured by using C as the lower layer and Si as the upper layer as in the examples. Alternatively, when using a metal such as Ta, Ti, Mo, or W or a compound of these metals as the lower layer, a material such as Ni or Cr can be used as the upper layer. The use of a metal material as the mask has the advantage that the deposition rate is high.

Formation of Dot Pattern

In the embodiment, it is possible to form a dot pattern having a uniform pattern density on the entire surface, and form a magnetic-nonmagnetic servo pattern in this dot pattern. The formation of the dot pattern requires a structure as a dot template.

As the template, a method such as self-organization, electron beam or molecular beam lithography, or imprinting is generally used. Examples of self-organization are a method using a phase-separated structure of a polymer such as a diblock copolymer or triblock copolymer, a method of forming an inorganic template by using a polymer such as mesoporous silica as a mold, a method of arranging fine particles having a uniform size as a monolayer, and a method using anodic alumina or a eutectic structure made of two or more types of materials. Of these methods, electron beam or molecular beam lithography or imprinting has low productivity because alignment with an original servo pattern must be performed. The use of a self-organization method is simple. That is, it is only necessary to form a self-organization structure on a medium, and transfer a pattern by etching such as RIE.

Formation of Servo Pattern

As a servo pattern, the pattern as shown in FIG. 6 is formed by cutting out only the servo area shown in FIG. 3 by using, e.g., an electron beam. When using an electron beam or molecular beam, an electron beam or a beam such as He accelerated to a high speed of a few 10 keV is radiated to write a target pattern on a resist.

This pattern is transferred as a three-dimensional pattern of a resist onto the medium by imprinting or an exposure apparatus. Referring to FIG. 6, the portions 3 are projections, and the portions 4 are recesses. To match the burst area of the servo pattern with the recording dot timing, guides or posts for arranging the recording dots can be formed as needed. In FIG. 6, posts for orienting the burst and dots are formed in the track portion. No posts are necessary if the dot arrangement is secured to some extent. The magnetism of the recording layer is inactivated by implanting ions into the recesses of the resist. Since ion implantation is performed on the posts, they cannot be used as data dots. Therefore, it is necessary to design a medium so as not to excessively increase the number of posts.

Note that in Comparative Examples 1 and 2, the projections and recesses of the imprint pattern shown in FIG. 6 are inverted. Since the resist recesses are nonmagnetic dots in the examples, the resist projections form the arrangement of magnetic dots. In the comparative examples, the self-organization material is arranged in only the resist recesses, so the resist recesses are used to arrange magnetic dots. To match the patterns, therefore, the recesses and projections in the comparative examples must be inverted from those in the examples.

Servo Formation by Ion Implantation

The magnetism of a portion other than a portion protected by the resist mask can be inactivated by ion implantation. "Inactivation of magnetism" mentioned in the present invention is to increase the concentration of an inactivation element in the non-recording area with respect to the recording area, thereby reducing the saturation magnetization Ms. Examples of a material usable in magnetism inactivation are H, He, B, C, N, F, Ne, Si, P, S, Ar, Cr, Mn, and As. Magnetization can efficiently be reduced by using these materials. Although the inactivation effect increases as the composition ratio of the inactivation element increases, the volume of the medium increases if the composition ratio is too high. The composition ratio of the inactivation element can be 1 (inclusive) to 90 (inclusive) at %, and further can be 5 (inclusive) to 50 (inclusive) at % with respect to the magnetic element. The Ms of the magnetism-inactivated region can be 50 at % or less, and further can be 10 at % or less that of the uninactivated region.

Self-Organization Material Arrangement Guide

Various methods can be used as guides for arranging the self-organization material. As in Example 1, it is simple to perform a brushing process of selectively depositing a PS monomolecular film in grooves formed by imprinting, and simultaneously rinse the film and imprint resist. Various materials such as PMMA, PDMS, and their copolymers can be used instead of PS. To arrange the self-organization material, it is possible to use a material having, as an index, a solubility parameter δ close to that of the target material. After the brushing process, it is possible to remove the imprint resist by $O_2$ plasma processing, and remove the brush film by rinsing. When rinsing the brush film, it is possible to use, e.g., toluene, xylene, PGMEA, or ethanol. The selective brushing process can match the dot arrangement directions in that portion. In an unbrushed region, dots are arranged along the right and left arranged regions. As a consequence, the overall arrangement improves.

It is possible to use not only a chemical guide but also a physical three-dimensional structure in arrangement. As in Example 2, a shallow three-dimensional structure of a few nm can be formed on the Si surface and used in a dot arrangement. If the three-dimensional structure is too shallow, it has no effect on the arrangement. If the three-dimensional structure is too high, a monolayer arrangement of dots becomes a two-layered arrangement. Therefore, the depth can be set at 10% (inclusive) to 50% (exclusive) of the dot pitch.

Patterning of Hard Mask

Various dry etching processes can be used as needed when patterning the hard mask. For example, when the first hard mask is C and the second hard mask is Si as in the examples, dry etching using halogen gas ($CF_4$, $CF_4/O_2$, $CHF_3$, $SF_6$, or $Cl_2$) can be used for the second hard mask. After that, dry etching can be performed on the first hard mask by using an oxygen-based gas such as $O_2$ or $O_3$, or a gas such as $H_2$ or $N_2$. When using a compound of Cr or Al as the hard mask, a Cl-based gas can be used. When using Ta, Ti, Mo, or W as the hard mask, the same halogen gas as that used for Si can be used.

Patterning of Magnetic Recording Layer

The magnetic recording layer is patterned by etching a portion other than a masked portion by ion milling or RIE, thereby forming a three-dimensional pattern on the recording layer. Forming a three-dimensional pattern normally means etching of the entire material of the recording layer. In some cases, a structure in which the recording layer material is partially left behind in the recesses is formed, or a structure such as a capped structure in which the first layer is entirely etched and the second and subsequent layers are left behind is formed.

In ion milling, it is possible to use a rare gas such as Ne, Ar, Kr, or Xe, or an inert gas such as $N_2$. When performing RIE, a gas such as a $Cl_2$-based gas, $CH_3OH$, or $NH_3+CO$ is used. When performing RIE, $H_2$ gas cleaning, baking, or washing may be necessary after etching.

Release Solution

As the release solution, a material capable of dissolving the above-mentioned liftoff layer can be used. For example, a weak acid such as a hydrogen peroxide solution or formic acid can be used. On the other hand, hydrochloric acid often forms micropores in the surface. It is also possible to use nitric acid, sulfuric acid, or phosphoric acid in a high-pH region. An example is a region where the pH is 3 to 6.

After the magnetic recording layer is patterned, the medium is dipped in the release solution and held in it for a few sec to a few min. After the liftoff layer and mask are sufficiently dissolved, the medium surface is washed with pure water, and the medium is transported to a later step.

Filling Step

Filling can be performed with high flatness on the magnetic recording medium according to the embodiment. As this filling, a sputtering method using a filling material as a target is used because the method is simple. However, it is also possible to use, e.g., plating, ion beam deposition, CVD, or ALD (Atomic Layer Deposition). When using CVD or ALD, deposition can be performed at high rate on the sidewalls of a highly tapered magnetic recording layer. Also, when a bias is applied to the substrate during filling deposition, even a high-aspect-ratio pattern can be filled up without any gaps. A method of forming a so-called resist such as SOG (Spin-On-Glass) or SOC (Spin-On-Carbon) by spin coating and curing the resist by annealing may also be used.

$SiO_2$ is used as the filling material in the examples, but the filling material is not limited to $SiO_2$, and it is possible to use any material as long as the hardness and flatness are allowable. For example, an amorphous metal such as NiTa or NiNbTi can be used as the filling material because the metal can easily be planarized. A material mainly containing C, e.g., $CN_x$ or $CH_x$, can be also used because the material has high hardness and well adheres to DLC. Oxides and nitrides such as $SiO_2$, $SiN_x$, $TiO_x$, and $TaO_x$ can also be used as the filling material. However, if the filling material forms a reaction product with the magnetic recording layer when brought into contact with the magnetic recording layer, a protective layer may be sandwiched between the filling layer and magnetic recording layer.

Protective Film Formation and Post-Process

Although the carbon protective film is desirably deposited by CVD in order to improve the coverage for the three-dimensional pattern, the film can also be deposited by sputtering or vacuum deposition. A DLC film containing a large amount of $sp^3$-bonded carbon is formed by CVD. If the film thickness is 2 nm or less, the coverage deteriorates. If the film thickness is 10 nm or more, the magnetic spacing between a recording/reproduction head and the medium increases, and the SNR often decreases. The protective film can be coated with a lubricant. As the lubricant, it is possible to use, e.g., perfluoro polyether, alcohol fluoride, or fluorinated carboxylic acid.

Magnetic Recording Layer

When the magnetic recording layer is made of an alloy, the alloy can contain Co, Fe, or Ni as a main component and can also contain Pt or Pd. The magnetic recording layer may also contain Cr or an oxide as needed. As the oxide, it is particularly possible to use silicon oxide or titanium oxide. Furthermore, the magnetic recording layer can contain one or more types of elements selected from Ru, Mn, B, Ta, Cu, and Pd, in addition to the oxide. These elements can improve the crystallinity and orientation. This makes it possible to obtain recording/reproduction characteristics and thermal fluctuation characteristics more suited to high-density recording.

As a perpendicular magnetic recording layer, it is possible to use a CoPt-based alloy, an FePt-based alloy, a CoCrPt-based alloy, an FePtCr-based alloy, CoPtO, FePtO, CoPtCrO, FePtCrO, CoPtSi, FePtSi, or a multilayered structure containing Co, Fe, or Ni and an alloy mainly containing at least one element selected from the group consisting of Pt, Pd, Ag, and Cu. It is also possible to use an MnAl alloy, SmCo alloy, FeNbB alloy, or CrPt alloy having a high Ku.

The thickness of the perpendicular magnetic recording layer can be, e.g., 3 to 30 nm, further, 5 to 15 nm. When the thickness falls within this range, a magnetic recording/reproduction apparatus more suited to high-density recording can be manufactured. If the thickness of the perpendicular magnetic recording layer is less than 3 nm, the reproduced output is too low, and the noise component often becomes higher than the reproduced signal. If the thickness of the perpendicular magnetic recording layer exceeds 30 nm, the reproduced output is too high and often distorts the waveform.

Interlayer

An interlayer made of a nonmagnetic material may be formed between a soft under layer and the recording layer. The interlayer has two functions, i.e., blocks the exchange coupling interaction between the soft under layer and recording layer, and controls the crystallinity of the recording layer. As the material of the interlayer, it is possible to use Ru, Pt, Pd, W, Ti, Ta, Cr, Si, Ni, Mg, an alloy containing these elements, or an oxide or nitride of these elements.

Soft Under Layer

The soft under layer (SUL) horizontally passes a recording magnetic field from a single-pole head for magnetizing the perpendicular magnetic recording layer, and returns the magnetic field toward the magnetic head, i.e., performs a part of the function of the magnetic head. The soft under layer has a function of applying a steep sufficient perpendicular magnetic field to the recording layer, thereby increasing the recording/reproduction efficiency. A material containing Fe, Ni, or Co can be used as the soft under layer. Examples of the material are FeCo-based alloys such as FeCo and FeCoV, FeNi-based alloys such as FeNi, FeNiMo, FeNiCr, and FeNiSi, FeAl-based and FeSi-based alloys such as FeAl, FeAlSi, FeAlSiCr, FeAlSiTiRu, and FeAlO, FeTa-based alloys such as FeTa, FeTaC, and FeTaN, and FeZr-based alloys such as FeZrN. It is also possible to use a material having a microcrystalline structure or a granular structure in which fine crystal grains are dispersed in a matrix. Examples are FeAlO, FeMgO, FeTaN, and FeZrN containing 60 at % or more of Fe. Other examples of the material of the soft under layer are Co alloys containing Co and at least one of Zr, Hf, Nb, Ta, Ti, and Y. The Co alloy can contain 80 at % or more of Co. When the Co alloy like this is deposited by sputtering, an amorphous layer readily forms. The amorphous soft magnetic material has none of magnetocrystalline anisotropy, a crystal defect, and a grain boundary, and hence has very high soft magnetism and can reduce the noise of the medium. Examples of the amorphous soft magnetic material are CoZr-, CoZrNb-, and CoZrTa-based alloys.

A base layer may also be formed below the soft under layer in order to improve the crystallinity of the soft under layer or improve adhesion to the substrate. As the material of this base layer, it is possible to use Ti, Ta, W, Cr, Pt, an alloy containing these elements, or an oxide or nitride of these elements.

In order to prevent spike noise, it is possible to divide the soft under layer into a plurality of layers, and insert 0.5- to 1.5-nm thick Ru, thereby causing antiferromagnetic coupling. The soft magnetic layer may also be exchange-coupled with a hard magnetic film having in-plane anisotropy such as CoCrPt, SmCo, or FePt, or a pinned layer made of an antiferromagnetic material such as IrMn or PtMn. To control the exchange coupling force, magnetic films (e.g., Co) or nonmagnetic films (e.g., Pt) can be stacked on the upper and lower surfaces of the Ru layer.

Figure 9:
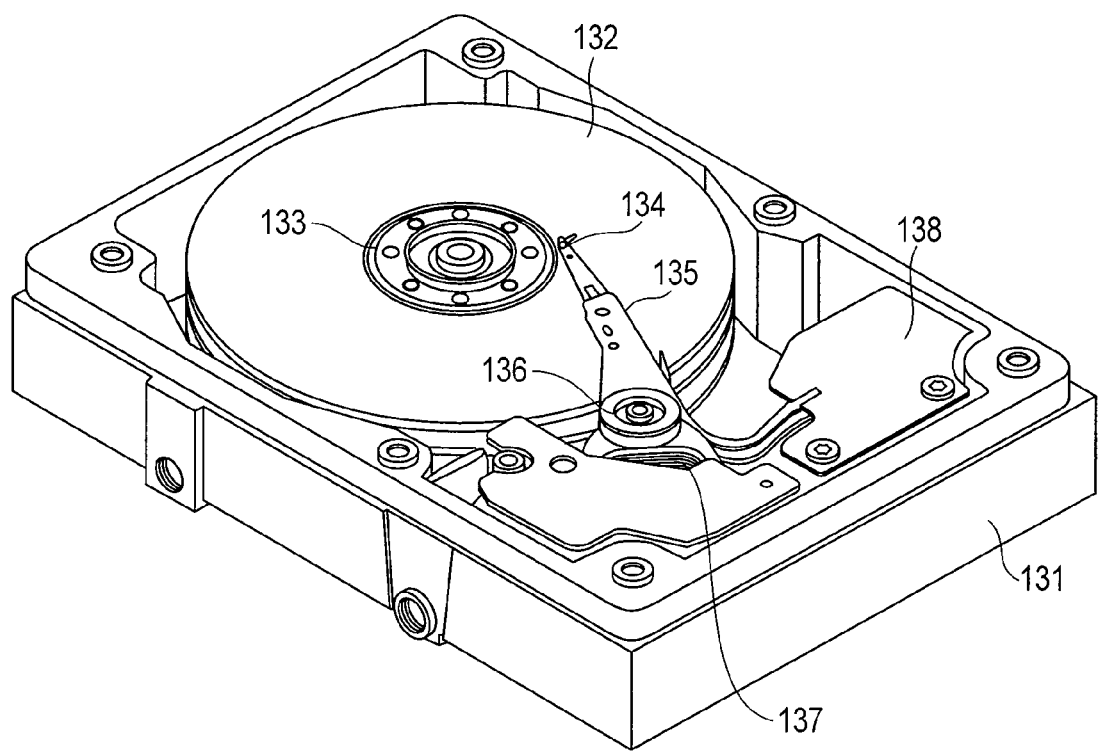
FIG. 9 is a partially exploded perspective view showing an example of a magnetic recording/reproduction apparatus to which the magnetic recording medium according to the embodiment is applicable.

FIG. 9 is a partially exploded perspective view showing an example of a magnetic recording/reproduction apparatus to which the magnetic recording medium according to the embodiment is applicable.

As shown in FIG. 9, a magnetic recording/reproduction apparatus 130 includes a rectangular boxy housing 131 having an open upper end, and a top cover (not shown) that is fastened to the housing 131 by using a plurality of screws and closes the open upper end of the housing.

The housing 131 houses, e.g., a perpendicular magnetic recording medium 132 manufactured by the method according to the embodiment, a spindle motor 133 as a driving means for supporting and rotating the perpendicular magnetic recording medium 132, a magnetic head 134 for performing recording and reproduction of magnetic signals with respect to the perpendicular magnetic recording medium 132, a head actuator 135 that includes a suspension having a distal end portion on which the magnetic head 134 is mounted, and supports the magnetic head 134 so that the magnetic head 134 can freely move with respect to the perpendicular magnetic recording medium 132, a rotating shaft 136 for rotatably supporting the head actuator 135, a voice coil motor 137 for rotating and positioning the head actuator 135 via the rotating shaft 136, and a head amplifier circuit 138.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording medium manufacturing method comprising:
    forming a resist layer on a magnetic recording layer of a magnetic recording medium, the magnetic recording medium comprising a substrate and the magnetic recording layer formed on the substrate;
    patterning the resist layer;
    performing ion implantation through the resist layer to partially inactivate magnetism of the magnetic recording layer and to form a magnetic pattern having a nonmagnetic region and a magnetic region;
    partially modifying a surface of the magnetic recording layer through the resist layer;
    removing the resist;
    applying a self-organization material to the partially modified surface of the magnetic recording layer, and causing phase separation to form a dotted mask pattern; and
    patterning the magnetic recording layer in accordance with the dotted mask pattern to form a magnetic dot and a nonmagnetic dot.

2. The method of claim 1, further comprising forming an additional mask layer on the magnetic recording layer before the forming the resist layer.

3. The method of claim 2, wherein the partially modifying the surface of the magnetic recording layer comprises forming a step on the additional mask layer by partially etching a surface of the additional mask layer through the resist layer.

4. The method of claim 1, wherein the partially modifying the surface of the magnetic recording layer comprises forming a chemical modification layer which promotes arrangement of the dotted mask pattern of the self-organization material on the resist layer.

5. The method of claim 1, wherein the patterning the resist layer comprises imprinting.

6. The method of claim 1, wherein the resist layer is used in patterning of a servo area.

7. The method of claim 1, wherein the patterning the magnetic recording layer comprises ion milling.

8. The method of claim 1, further comprising planarizing the patterned magnetic recording layer by filling up the magnetic recording layer after the patterning the magnetic recording layer.

9. A magnetic recording medium manufacturing method comprising:
    forming a resist layer on a magnetic recording layer of a magnetic recording medium, the magnetic recording medium comprising a substrate and the magnetic recording layer formed on the substrate;
    patterning the resist layer;
    performing ion implantation through the resist layer to partially inactivate magnetism of the magnetic recording layer, to form a magnetic pattern having a nonmagnetic region and a magnetic region, and to partially modify a surface of the magnetic recording layer;
    removing the resist;
    coating the partially modified surface of the magnetic recording layer with a self-organization material, and causing phase separation to form a dotted mask pattern; and
    patterning the magnetic recording layer in accordance with the dotted mask pattern to form a magnetic dot and a nonmagnetic dot.

10. The method of claim 9, further comprising forming an additional mask layer on the magnetic recording layer before the forming the dotted mask pattern.

11. The method of claim 9, wherein the patterning the resist layer comprises imprinting.

12. The method of claim 9, wherein the resist layer is used in patterning of a servo area.

13. The method of claim 9, wherein the patterning the magnetic recording layer comprises ion milling.

14. The method of claim 9, further comprising planarizing the patterned magnetic recording layer by filling up the magnetic recording layer after the patterning the magnetic recording layer.

* * * * *